United States Patent
Almy et al.

(10) Patent No.: US 9,793,852 B2
(45) Date of Patent: Oct. 17, 2017

(54) CLAMP AND BOWL MOUNTING SYSTEM FOR PHOTOVOLTAIC MODULES

(71) Applicant: SolarCity Corporation, San Mateo, CA (US)

(72) Inventors: Charles Almy, Berkeley, CA (US); Tyrus Hawkes Hudson, Petaluma, CA (US); David Molina, Oakland, CA (US)

(73) Assignee: SOLARCITY CORPORATION, San Mateo, CA (US)

( * ) Notice: Subject to any disclaimer, the term of this patent is extended or adjusted under 35 U.S.C. 154(b) by 0 days.

(21) Appl. No.: 14/800,666

(22) Filed: Jul. 15, 2015

(65) Prior Publication Data

US 2017/0019056 A1    Jan. 19, 2017

(51) Int. Cl.
*H02S 20/23* (2014.01)
*F24J 2/52* (2006.01)
(Continued)

(52) U.S. Cl.
CPC ............ *H02S 20/23* (2014.12); *F16M 13/02* (2013.01); *F24J 2/5256* (2013.01); *H02G 3/32* (2013.01);
(Continued)

(58) Field of Classification Search
CPC ........ F16M 13/02; Y02E 10/47; Y02B 10/12; H02S 20/22; H02S 20/23; H02S 20/24; H02S 20/25; H02S 20/20; F24J 2/5258; F24J 2/5245; F24J 2/5249; F24J 2/525; F24J 2/5254; F24J 2/526; F24J 2/5256; F24J 2/5264; F24J 24/487; F24J 2002/4663; F24J 2002/4665; F24J 2002/4669;
(Continued)

(56) References Cited

U.S. PATENT DOCUMENTS 3,088,702 A * 5/1963 Orenick .................. F16L 3/233
174/40 CC
3,100,922 A * 8/1963 Burniston ................. F16L 3/12
248/71

(Continued)

FOREIGN PATENT DOCUMENTS

DE    200 11 063 U1    9/2000
DE    103 10 457 A1    9/2004
(Continued)

OTHER PUBLICATIONS

International Search Report, mailed Dec. 23, 2016, for related International Patent Application, PCT/US2016/041476, 6 pages.
(Continued)

*Primary Examiner* — Patrick Hawn
(74) *Attorney, Agent, or Firm* — Kilpatrick Townsend & Stockton LLP (57) ABSTRACT

A photovoltaic (PV) mounting hardware support system having a base portion. The system includes a hinged clamp having a first clamp portion hingedly connected to a second clamp portion and operable to lock and unlock the first clamp portion and second clamp portion to the base portion. A beam member is provided and configured as a mount for a PV module coupling device. The beam member is clamped between the first clamp portion and second clamp portion.

17 Claims, 6 Drawing Sheets

(51) Int. Cl.
*H02G 3/32* (2006.01)
*H02S 20/20* (2014.01)
*F16M 13/02* (2006.01)
*F24J 2/46* (2006.01)

(52) U.S. Cl.
CPC ....... *H02S 20/20* (2014.12); *F24J 2002/4663* (2013.01); *F24J 2002/4665* (2013.01); *F24J 2002/4669* (2013.01); *F24J 2002/4672* (2013.01)

(58) Field of Classification Search
CPC ............. F24J 2002/4672; F16L 3/1075; F16L 3/1033; F16L 3/1041; H02G 3/32
USPC ......... 248/71, 73, 74.1; 24/487, 16 PB, 16 R
See application file for complete search history.

(56) References Cited

U.S. PATENT DOCUMENTS

| | | | |
|---|---|---|---|
| 3,987,992 A | 10/1976 | Foflygen | |
| 4,061,299 A * | 12/1977 | Kurosaki | F16L 3/1203 248/222.12 |
| 4,264,047 A * | 4/1981 | Nelson | F16L 3/12 24/339 |
| 5,070,666 A | 12/1991 | Looman | |
| 5,494,245 A * | 2/1996 | Suzuki | F16L 3/1075 24/487 |
| 5,557,903 A * | 9/1996 | Haddock | E04D 3/3607 52/408 |
| 5,971,663 A * | 10/1999 | Brothers | F16L 3/1091 138/107 |
| 6,164,603 A * | 12/2000 | Kawai | F16L 3/23 24/297 |
| 6,672,018 B2 * | 1/2004 | Shingleton | F24J 2/5205 126/621 |
| 6,875,914 B2 | 4/2005 | Guha et al. | |
| 6,948,687 B2 | 9/2005 | Shatzky | |
| 7,780,472 B2 | 8/2010 | Lenox | |
| 7,784,745 B2 * | 8/2010 | Dodge | F16L 3/12 138/149 |
| 8,122,648 B1 * | 2/2012 | Liu | F24J 2/5245 126/623 |
| 8,176,693 B2 | 5/2012 | Abbott et al. | |
| 8,245,460 B2 | 8/2012 | Yamanaka et al. | |
| 8,250,829 B2 | 8/2012 | McPheeters et al. | |
| 8,341,917 B2 | 1/2013 | Resso et al. | |
| 8,413,944 B2 | 4/2013 | Harberts et al. | |
| 8,590,223 B2 | 11/2013 | Kilgore et al. | |
| 8,661,765 B2 | 3/2014 | Schaefer et al. | |
| 8,733,718 B2 * | 5/2014 | Corsi | E04B 1/40 248/205.1 |
| 8,740,163 B1 | 6/2014 | Taylor et al. | |
| 8,752,338 B2 | 6/2014 | Schaefer et al. | |
| 8,756,881 B2 | 6/2014 | West et al. | |
| 8,801,349 B2 | 8/2014 | McPheeters | |
| 8,839,573 B2 | 9/2014 | Cusson et al. | |
| 8,904,718 B2 | 12/2014 | Schick et al. | |
| 8,935,893 B2 | 1/2015 | Liu et al. | |
| 8,936,224 B2 | 1/2015 | Bartelt-Muszynski et al. | |
| 8,984,818 B2 | 3/2015 | McPheeters et al. | |
| 9,531,319 B2 | 12/2016 | Braunstein et al. | |
| 2003/0089828 A1 | 5/2003 | Korczak et al. | |
| 2010/0269447 A1 | 10/2010 | Schuit et al. | |
| 2010/0276558 A1 | 11/2010 | Faust et al. | |
| 2011/0138585 A1 | 6/2011 | Kmita et al. | |
| 2011/0192098 A1 | 8/2011 | Chung | |
| 2011/0253190 A1 | 10/2011 | Farnham, Jr. | |
| 2011/0260027 A1 | 10/2011 | Farnham, Jr. | |
| 2011/0277296 A1 * | 11/2011 | Ramos | F24J 2/5205 29/428 |
| 2012/0138764 A1 | 6/2012 | Kemple | |
| 2012/0304556 A1 | 12/2012 | Teller et al. | |
| 2013/0133270 A1 * | 5/2013 | West | E04B 1/38 52/58 |
| 2013/0193301 A1 | 8/2013 | Jackson et al. | |
| 2013/0320166 A1 | 12/2013 | Kemple et al. | |
| 2014/0003861 A1 | 1/2014 | Cheung et al. | |
| 2015/0129517 A1 | 5/2015 | Wildes | |
| 2015/0155823 A1 | 6/2015 | West et al. | |
| 2016/0311854 A1 | 10/2016 | Hakansson | |

FOREIGN PATENT DOCUMENTS

| | | |
|---|---|---|
| DE | 202009012870 U1 | 1/2010 |
| DE | 10 2010 020218 A1 | 11/2011 |
| DE | 202013002857 U1 | 5/2013 |
| WO | 03/001069 A1 | 1/2003 |
| WO | 2006/094609 A1 | 9/2006 |
| WO | 2013/092905 A1 | 6/2013 |
| WO | 2013/110456 A2 | 8/2013 |
| WO | 2014/169396 A1 | 10/2014 |

OTHER PUBLICATIONS

Written Opinion, mailed Dec. 23, 2016, for related International Patent Application, PCT/US2016/041476, 8 pages.
Non-Final Office Action, dated Jul. 27, 2017, for related U.S. Appl. No. 14/800,681, 17 pages.

* cited by examiner

CLAMP AND BOWL MOUNTING SYSTEM FOR PHOTOVOLTAIC MODULES

CROSS REFERENCE RELATED APPLICATIONS

This application is related to co-assigned and co-invented patent application Ser. No. 14/800,681, entitled "Wedge Spring Clip Mounting System for Photovoltaic Modules," filed on Jul. 15, 2015, which is incorporated by reference herein.

BACKGROUND OF THE INVENTION

There are many systems available for mounting photovoltaic (PV) modules to building structures, such as a roof. These systems serve as a rigid interconnection element between a roof and a PV module to hold the modules in place and resist the forces of gravity and wind.

Traditionally, mounting systems consisted of rows of rail structures attached to the roof in columns or rows. Module clamps were used to attach the PV modules to these rail structures. Although effective, these traditional systems required complex and time-consuming installations and utilized relatively large amount of materials. Eventually, pioneers in the solar industry, such as Jack West of San Rafael-based Zep Solar, realized that module frames themselves are sufficiently rigid to function as the rails of a PV mounting system. By utilizing the inherent rigidity of modules frames as part of the PV mounting system, system part counts and costs of PV mounting systems were significantly reduced while installation time and overall aesthetics were improved. This realization caused the majority of the residential solar industry to move away from rail-based solutions. However, in order to continue the momentum of solar against other fossil fuel-based energy sources, it is imperative that both hard and soft PV costs continue to be reduced.

Most rail-free or so-called direct mount systems, rely on pillar-like PV module supports which connect to each module frame at various points around the array—typically at least four points on each module. These module supports are in turn attached to the roof, either into a roof rafter or directly to the roof deck, via a flashing. The flashing is just a flat sheet of aluminum with a preformed feature designed to mate with the module support and typically including at least one lag-bolt through-hole for securing both the flashing and the module support to the roof.

Although effective at reducing water leaks and covering missed drill holes, flashings can increase the time of installation because when they are used, the installer must complete all site preparation first before placing any of the PV modules, installing a flashing at each intended roof penetration. This bottleneck prevents an installer from installing the array row-by-row or panel-by-panel and, as a result, may slow-down the rate at which PV can be installed, may require larger installation crews, or both. Also, because each flashing gets tucked underneath the next up-roof course of shingles, it is often necessary to remove existing roofing nails to accommodate the flashings. Each time an existing roofing nail is removed, a new potential leak point is created. Finally, each flashing adds a material cost to each solar installation that becomes significant when multiplied against every roof penetration of every installed array.

Accordingly, there is a need for a rail-free PV mounting system that enjoys the benefits of existing rail-free solutions, while reducing costs, and increasing installation times relative to such systems.

BRIEF SUMMARY OF THE INVENTION

Many embodiments are related to photovoltaic (PV) mounting system having a base portion that can be substantially planar and have a first roof-facing side and an opposite PV array facing side. The base portion can include a lip that circumscribes the perimeter of the base portion and curves inward on the array facing side. A hinged clamp is provided that includes a pair of flanges, In a first open position of the hinged clamp, the flanges are insertable into the array-facing opposite side of the base portion and in a second closed position of the hinged clamp the flanges are expanded to engage the lip of the base portion to selectively couple the hinged clamp to the base portion and define two circular openings that are substantially orthogonal to the plane of the base portion. At least one locking tab can be formed in the hinged clamp operable to selectively lock and unlock the hinged clamp. The hinged clamp captures a tubular beam member when it is locked in the second closed position, the beam member passing through the two circular openings defined by the clamp. At one end, the tubular beam member supports a PV coupling device that in turn couples to the frames of at least two photovoltaic modules.

In many embodiments, the base portion can be a circular puck having a through-hole for mounting the base portion to a structure by a lag-bolt.

In many embodiments, in the second closed position of the clamp, the pair of flanges forms a boxed structure extending upwardly from the base portion.

In many embodiments, the clamping flanges can have a splined clamping surface configured for gripping the tubular beam member.

In many embodiments, the tubular beam member can have a splined beam surface for gripping the splined surface of the clamping flanges.

In many embodiments, moving the hinged clamp to the second position spreads the flanges outwardly from each other and into the lip of the base portion.

In many embodiments, each of the flanges can include a pair of semi-circular edges that form the two circular openings.

In many embodiments, the semi-circular edges apply a compressive force against the tubular beam member.

In many embodiments, the PV module coupling device is a pivot locking coupling device.

In many embodiments, the PV module coupling device includes an upper and lower clamp.

Many embodiments are also related to a photovoltaic (PV) mounting hardware support system having a base portion. A hinged clamp that includes a pair of flanges connected by hinges can be provided. In a first open position of the hinges, the hinged clamp may be freely inserted into the base portion and in a second closed position of the hinges, the hinged clamp is locked to the base portion. A beam member can be provided and configured as a mount for a PV module coupling device. In the second position of the hinged clamp the beam member is forcibly held between openings formed by the pair of flanges.

In many embodiments, the base portion can be a circular puck adapted to mount to a structure via a lag bolt.

In many embodiments, the base portion includes a lip that the pair of flanges forcibly locks within.

In many embodiments, the pair of flanges forms a boxed structure for holding the beam member.

In many embodiments, the pair of flanges can include locking tabs configured to maintain the pair of flanges in position to forcibly hold the beam member.

In many embodiments, the pair of flanges include splined surfaces for engaging the beam member.

Many embodiments are also related to a photovoltaic (PV) mounting hardware support system that includes a base portion. A hinged clamp is provided that includes a first clamp portion hingedly connected to a second clamp portion. The hinged clamp may be operable to lock and unlock the first clamp portion and second clamp portion to the base portion. A beam member can be provided that serves as a mount for a PV module coupling device. The beam member can be clamped between the first clamp portion and second clamp portion.

In many embodiments, the base portion can include a lip that the first clamp portion and second clamp portion lock to.

In many embodiments, the hinged clamp can include a first hinge and a second hinge that hingedly connect the first clamp portion and second clamp portion.

In many embodiments, the hinged clamp can close to form a boxed structure about the beam member.

In many embodiments, the hinged clamp can include wedges that forcibly lock into the base portion.

DETAILED DESCRIPTION OF THE INVENTION

Embodiments of the invention are generally directed towards a system for mounting a PV module to a support structure such as a roof surface. The system can include a base portion assembly and a clamp assembly for supporting a PV module. The clamp assembly may include a hinged clamp that when actuated from a first position to a second position with the base portion assembly, provides a boltless system for rigidly fixing the clamp assembly to the base portion assembly in a sufficient manner to permanently support the weight of one or more PV modules. Advantageously, such as system requires little to no tools for installation, and hence installation time is greatly reduced over prior systems that require additional tools and bolting. The following description details some examples of such a system.

Figure 1A:
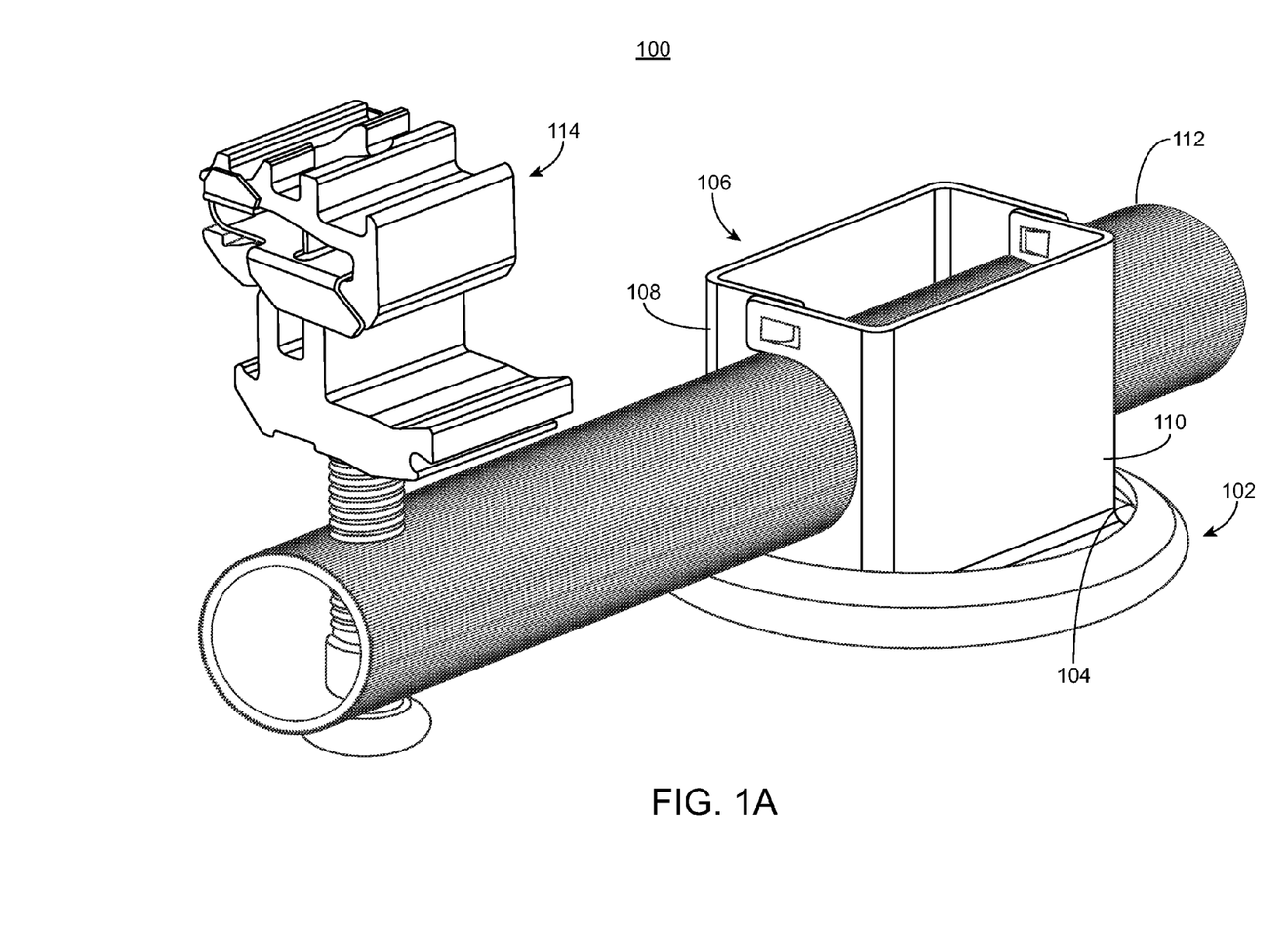
FIGS. 1A and 1B show perspective views of an exemplary PV mounting system, according to an embodiment of the invention.
Figure 1B:
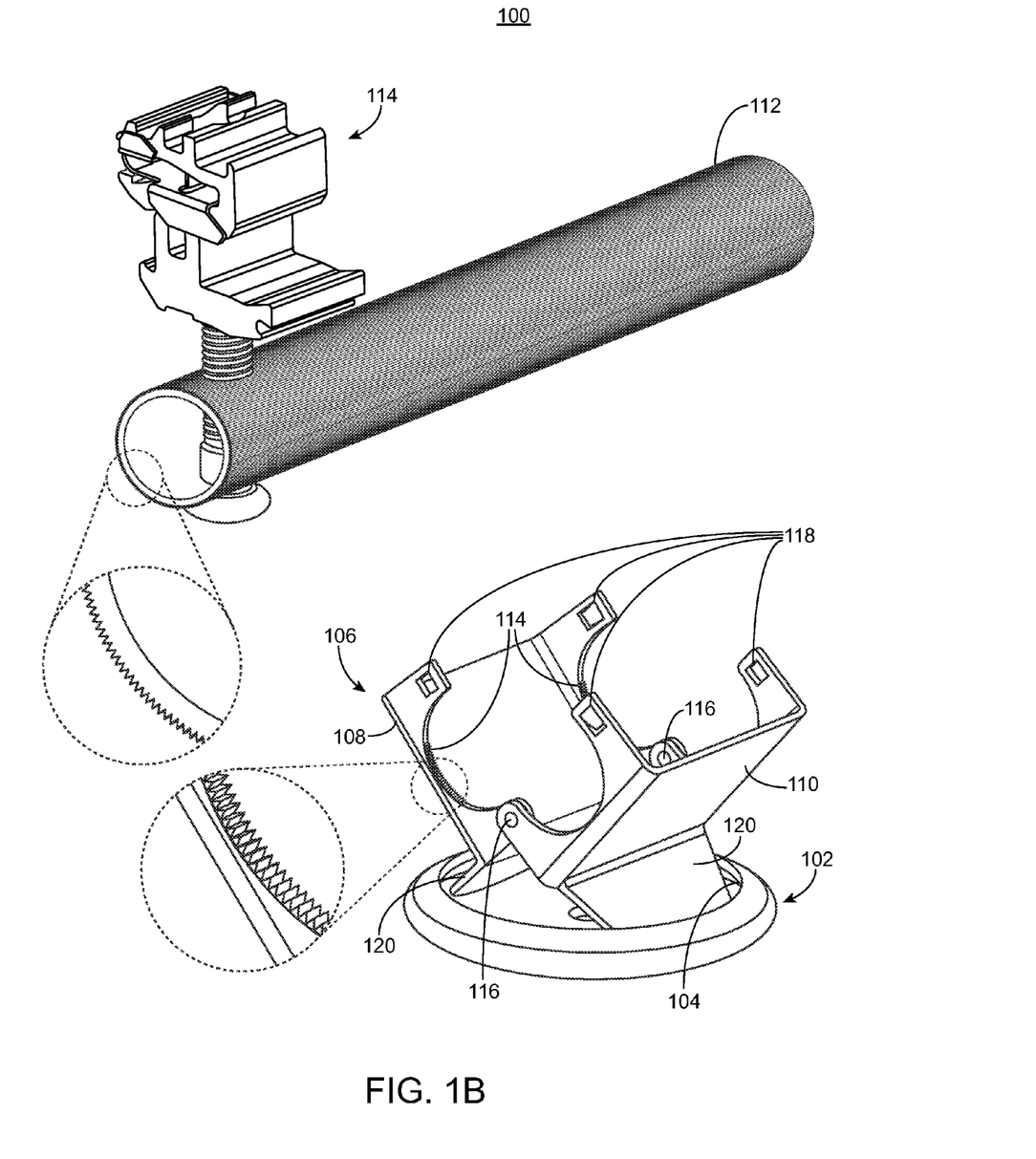
Figure 1C:
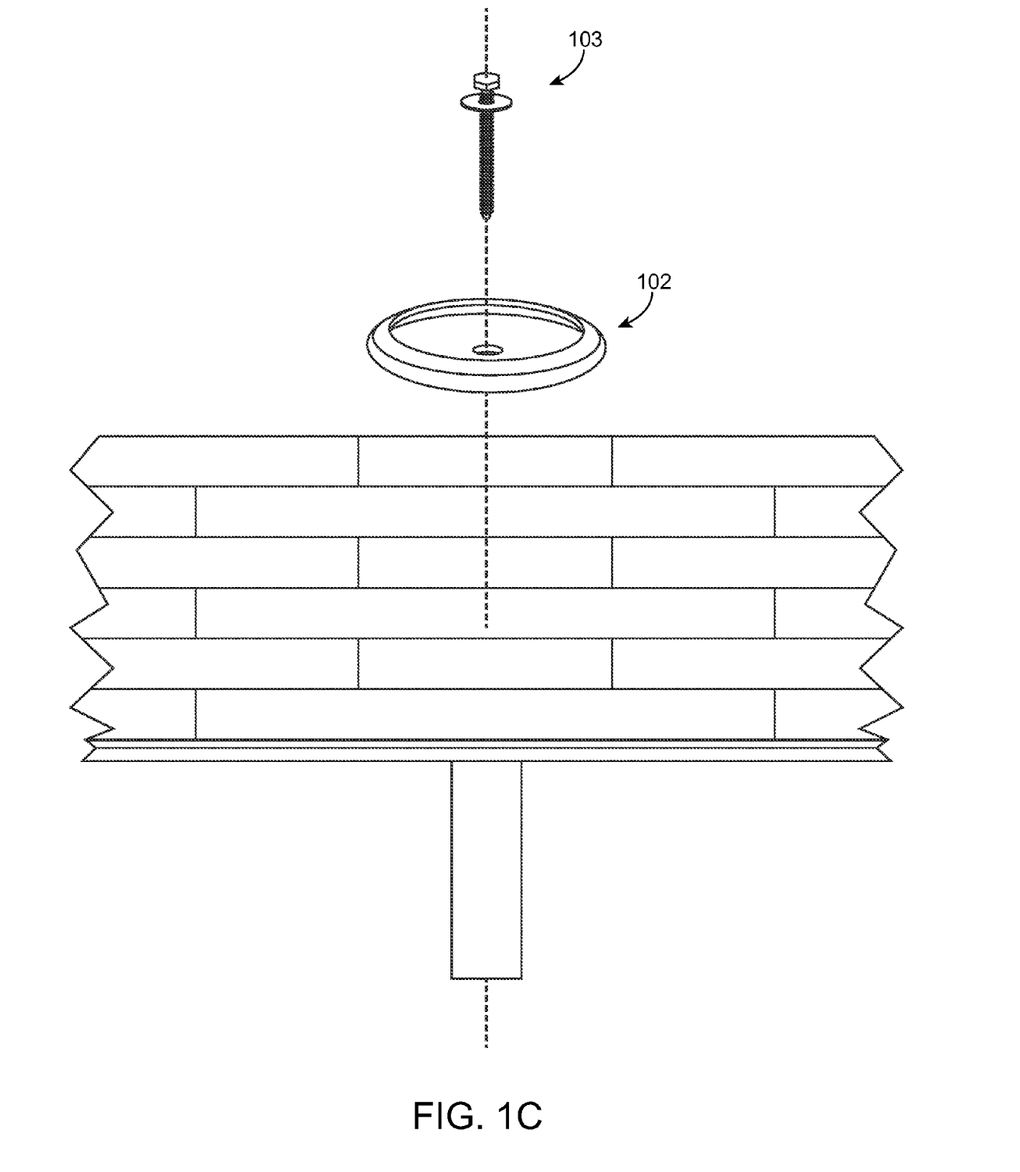
FIG. 1C shows an exploded view of an aspect of the system of FIG. 1A, according to an embodiment of the invention.

FIGS. 1A and 1B show perspective views of an exemplary system 100 for mounting a PV module to a structure, such as a roof. The system 100 includes a base portion 102, which here is formed as a puck having an inner lip 104 that can curve inwardly. The base portion 102 has a lower roof-facing surface that is configured to directly or indirectly mount to a support structure, and can include one or more passages for accommodating a fastener such as a lag bolt 103. In various embodiments, for example, as illustrated in FIG. 1C, lag bolt 103 may be installed through an opening formed in base portion 103 so as to penetrate the roof surface at a point over a roof rafter. This may be accomplished by drilling a pilot hole at the desired point in the roof over the roof rafter prior to lagging in lag bolt 103 through base 102. It should be appreciated that although there is only a single lag bolt hole in base portion 102, in various embodiments, it may be desirable to have two or more through-holes to permit more than one fastening point to the roof surface. Moreover, base portion 102 is not limited to the puck-like design illustrated in the figures. For example, inner lip 104 may be integrated into a flashing or specialized shingle to provide the functionality of base portion 102 in a different form.

With continuing reference to FIGS. 1A-C, clamp 106 extends upwardly from a PV module-facing side of base portion 102. Clamp 106 includes first clamp portion 108 hingedly connected to second clamp portion 110, which as shown at FIG. 1A, forms a boxed structure that holds elongated support beam 112. Elongated support beam 112 is configured here as a tube having a splined surface for gripping the clamp 106. It should be appreciated, however, that in various embodiments, beam 112 may include cross-hatching, may be knurled, or may simply be textured to increase friction with clamp 106. Elongated support beam 112 in turn supports PV module coupling device 114 that is configured to couple to the frames of at least two photovoltaic modules.

Figure 4:
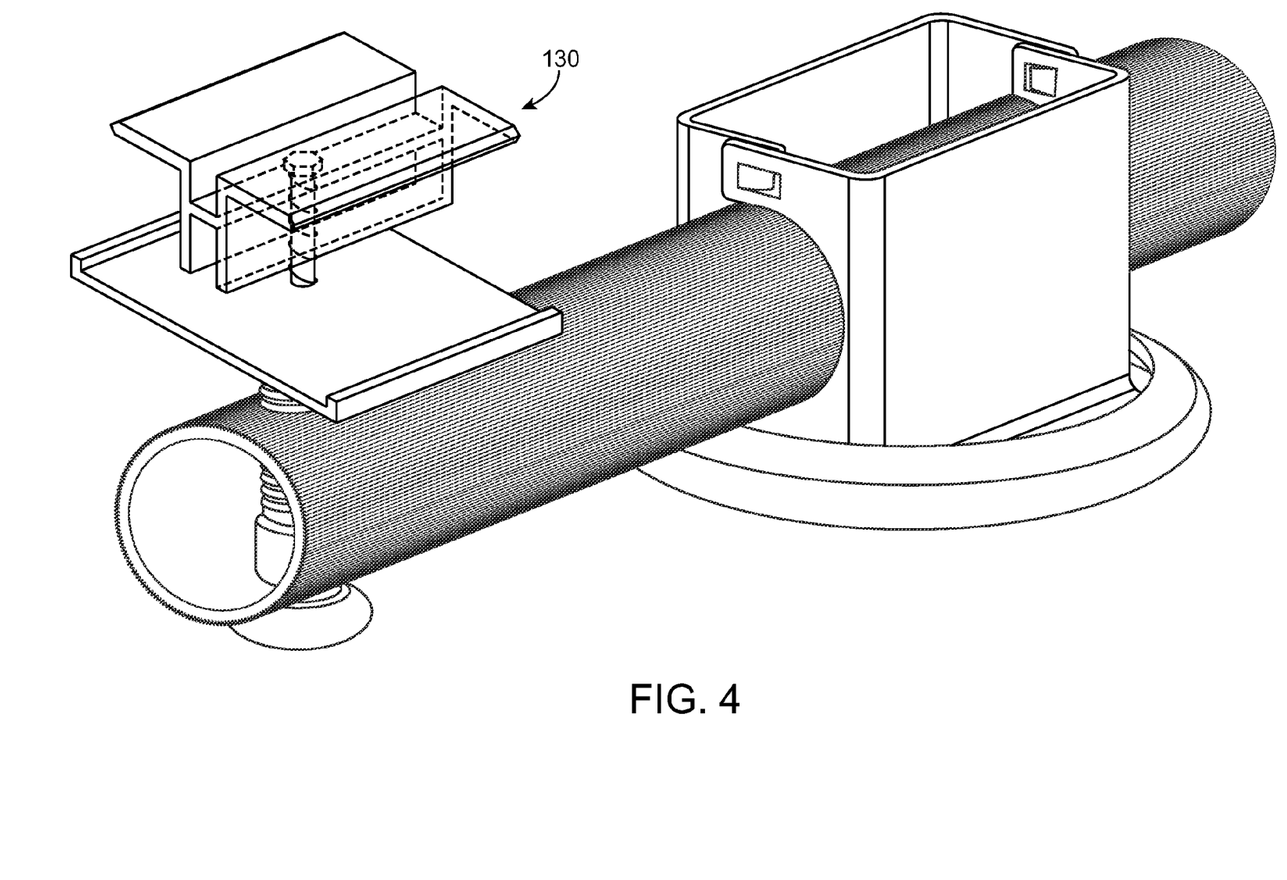
FIG. 4 shows a perspective view of another exemplary PV mounting system, according to an embodiment of the invention.

The PV module coupling device 114 shown in the aforementioned figures is a "rock-it" style connector manufactured by SolarCity Corp., which is arranged to connect to the frames of two adjacent PV modules. Such a coupling device is described and illustrated, for example, in commonly assigned U.S. patent application Ser. No. 14/615,320, Publication No. 2015/0155823-A1, the disclosure of which is herein incorporated by reference in its entirety. However, the system 100 is not limited to use of such a coupling device. A multitude of different styles of coupling devices are compatible with the system, for example, such as the coupling device 130 illustrated at FIG. 4, which depicts a clamping-style coupling device 130 with an upper and lower clamp arranged to clamp the top and bottom portions of a PV module. A clamping-style coupling device typically utilizes a rigid base portion and a movable top clamping portion that under pressure from a top-mounted bolt, compresses the movable top-clamping portion towards the base portion, thereby compressing the respective frames of two photovoltaic modules. The various embodiments of the invention may be used with a variety of different types of PV module coupling devices.

Continuing with the exemplary embodiment illustrated in FIGS. 1A-C, elongated support beam 112 is configured as a tube, which allows for rotational as well as longitudinal adjustment of PV coupling device 114 with respect to base portion 102 during installation and module placement. For example, in various embodiments, spring 106 will be free to rotate 360 degrees within base portion 102. Also, longitudinal adjustment may be made by moving coupling device 114 toward or away from spring 106 before fully compressing spring 106 into the second closed position. As discussed above, in at least one embodiment, the exterior surface of the elongated support beam 112 is splined to prevent rotation with respect to the clamp 106. In addition, interior facing edges 114 of clamp 106 may also be geared or toothed in a reciprocal manner to fit snuggly together with the external spline of support beam 112. Alternatively, interior facing edges 114 of the clamp 106 may simply be knurled or textured, such as with cross-hatching, to increase friction with support beam 112. While shown as a tube, additional shapes are possible for the elongated support beam 112, such as a rectangular or hexagonal shape.

As shown at FIG. 1B, first clamp portion 108 is connected to second clamp portion 110 by way of hinges 116. Interior facing edges 114 of each clamp portion are semi-circular, such that when first clamp portion 108 is brought together with second clamp portion 110, two co-axial circular openings are formed. Each clamp portion also includes at least one, and preferably a pair of tabs such as tabs 118 for selectively maintaining the clamp portions together. Each clamp portion also includes wedge portion 120 having a duck-bill shape approximating a portion of the circle circumscribed by lip 104 of base portion 102 and adapted to forcibly wedge within the lip 104 of the base portion 102.

Figure 2A:
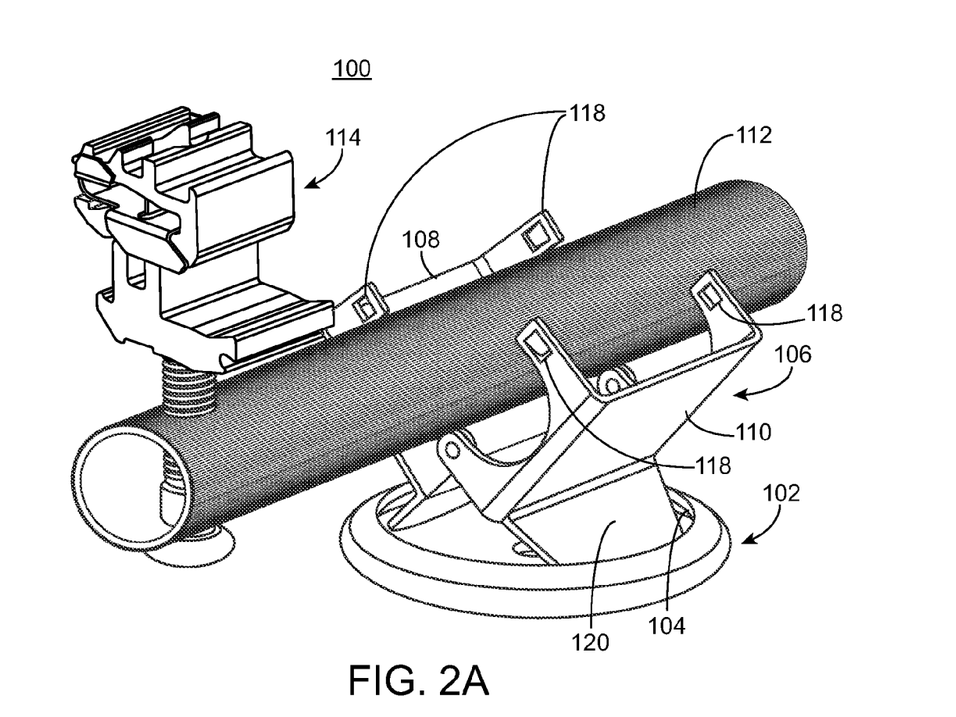
FIGS. 2A and 2B show operational views of the system of FIG. 1A, according to an embodiment of the invention.
Figure 2B:
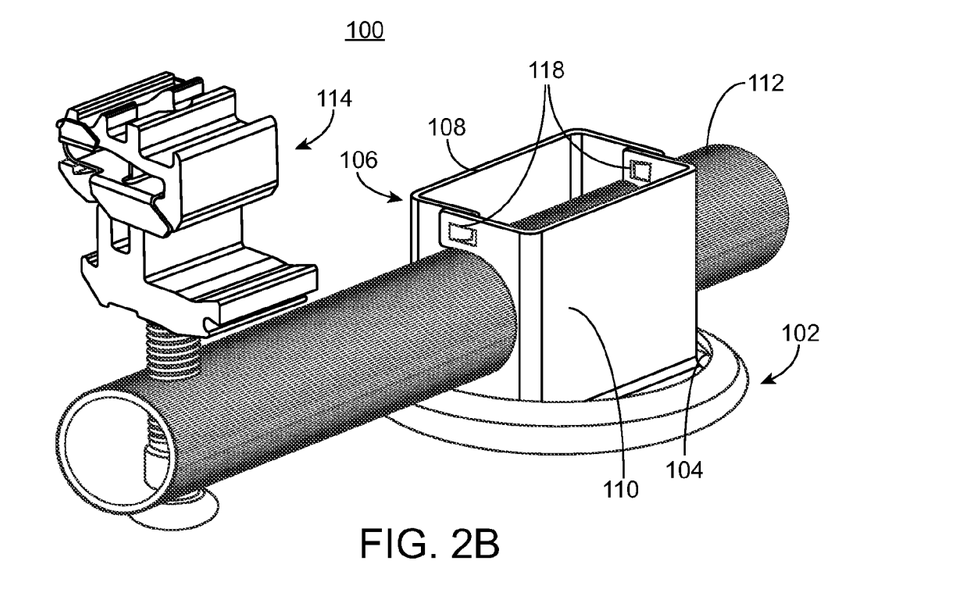

A tool-free and boltless operation for installing the system 100 is shown at FIGS. 2A and 2B, after the base portion 102 is pre-installed to a structure, such as a roof, for example, using the methodology discussed in the context of FIG. 1C. As shown, clamp 106 is arranged within base portion 102, with wedge portions 120 tucked into lip 104. When clamp 106 is fully opened, it can be freely inserted into base 102 at an infinite number of different rotational angles by simply turning clamp 106 within base portion 102. The elongated support beam 112 is then brought down between first clamp portion 108 and second clamp portion 110, and placed in a desired location with respect to rotational and longitudinal placement of the PV module coupling device 114. This is particular useful to accommodate situations where the interconnection point between two adjacent PV modules is not co-located with a roof rafter.

After support beam 112 has been placed at the desired location, and in some cases after coupling device 114 was been attached to the frame of one of the photovoltaic modules (e.g., the down-roof module using tongue side of coupling device 114), first clamp portion 108 and second clamp portion 110 are then closed shut about elongated support beam 112 until tabs 118 are locked to each other, thus forming a boxed structure, as shown at FIG. 2B. As noted above, the interior facing edges 114 form two circular openings, which can be sized to have zero or negative clearance with respect to the outer diameter of the elongated support beam 112. Hence, the first clamp portion 108 and second clamp portion 110 are brought together such that a compressive force is placed on the elongated support beam 112 by the interior facing edges 114, to prevent any slippage. In various embodiments, this is accomplished by simply applying manual compression to clamp portions 108 and 110 until tabs 118 become locked.

As the first clamp portion 108 and second clamp portion 110 are closed shut, wedge portions 120 spread outwardly and become completely wedged into lip 104, as shown at FIG. 2B, thus locking clamp 106 securely into the base portion 102, and preventing rotational, lateral, and vertical displacement of the clamp 106 with respect to the base portion 102. This in turn insures that module coupling device 114, and by extension photovoltaic modules in the array that are supported by module coupling device 114, remain in place at the same location. Accordingly, the system 100 provides a substantially tool-free method of installing and adjusting a PV module support device.

If placement of the system 100 is incorrect, or if for whatever reason, an installer needs to remove the module attached to coupling device 114, the installer need only unclasp tabs 118 to open the clamp 106, reposition the elongated support beam 112 as desired, and then reclose the clamp 106. This may be accomplished by merely compressing spring portions 108 and 110 towards each other until tabs 118 release or by inserting a screw driver or other tool directly into tables 118 until they release.

Figure 3:
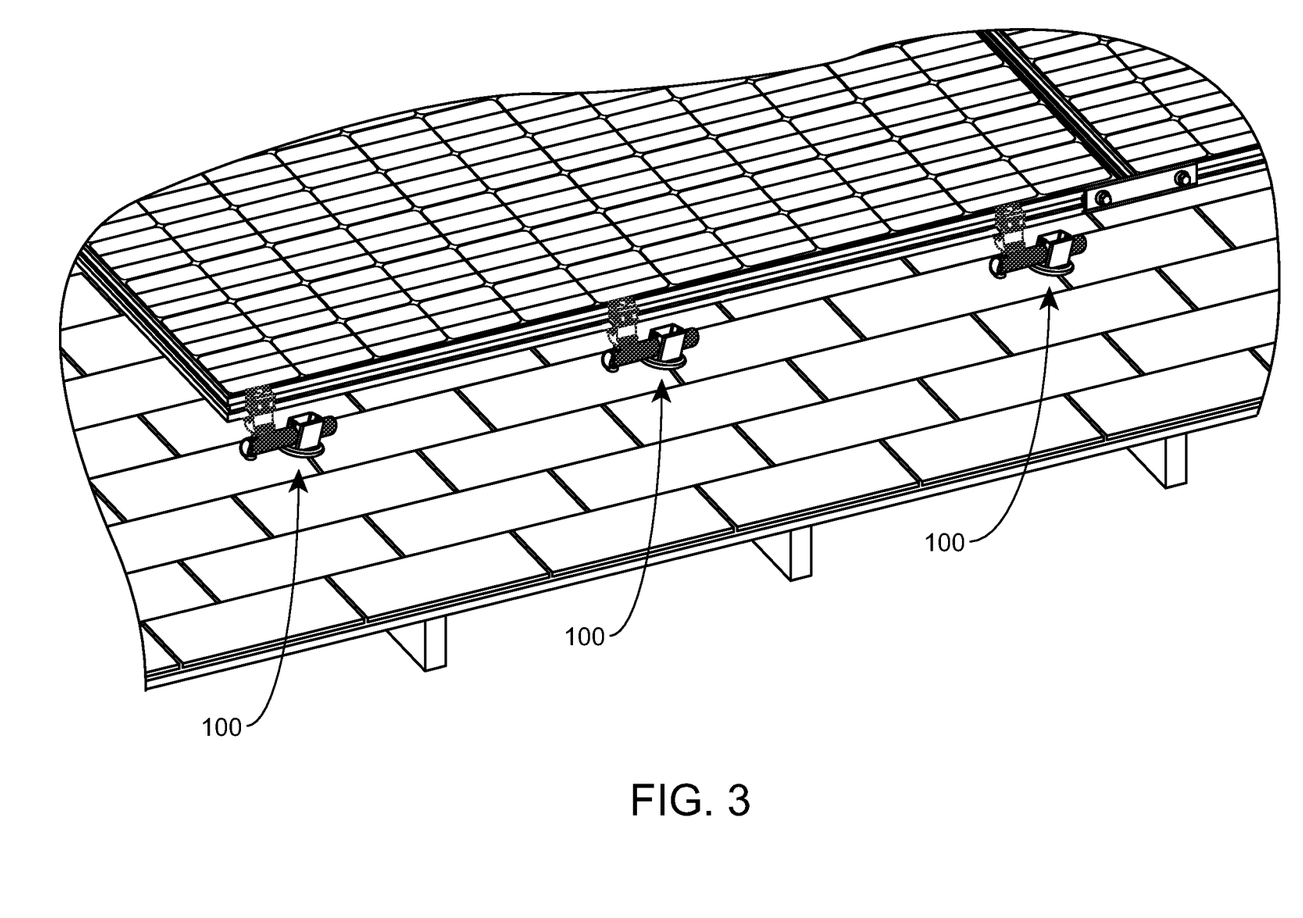
FIG. 3 show the system of FIG. 1A in use, according to an embodiment of the invention.

FIG. 3 shows a plurality of systems 100 mounted to a roof and supporting an array of PV modules. While the system 100 is shown mounted to a sloped roof, the system 100 can be used on a variety of structures. Moreover, although the roof shown in FIG. 3 is a composition shingle roof, the mounting system 100 according to the various embodiments may be used with a flat tile, curved tile, shake, or other type of residential or commercial roof.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:
1. A photovoltaic (PV) mounting system comprising:
a base portion having a first roof-facing side, and an opposite module-facing side, wherein the base portion comprises a lip that circumscribes the perimeter of the base portion curves inward toward a middle portion of the module-facing side;

a hinged clamp comprising:
  a first clamp portion comprising a first upper portion and a first flange; and
  a second clamp portion comprising a second upper portion and a second flange, wherein the first clamp portion and second clamped portion are connect by a hinge, and, wherein the hinged clamp is configurable to be positioned in a first open position in which the first and second flanges are insertable against the module-facing side of the base portion and ends of the first and second flanges are positioned a first distance apart, and configurable to be positioned in a second closed position in which the ends of the first and second flanges are spread apart to a second distance, greater than the first distance, and engage the lip of the base portion to selectively couple the hinged clamp to the base portion;
at least one locking mechanism formed in the hinged clamp operable to selectively lock the first upper portion to the second upper portion in the second closed position; and
a tubular beam member including a PV coupling device for coupling together frames of at least two photovoltaic modules, wherein the tubular beam member is captured between the first upper portion and the second upper portion when the hinged clamp is locked in the second closed position.

2. The PV mounting system of claim 1, wherein the base portion comprises a puck having a through-hole formed therein for accepting a mechanical fastener used to mount the base portion to a support structure, wherein the hinged clamp covers a module-facing side of the through hole in the second closed position.

3. The PV mounting system of claim 1, wherein in the second closed position the first upper portion and the second upper portion form a boxed structure extending upwardly from the base portion.

4. The PV mounting system of claim 1, wherein interior edges of the first upper portion and the second upper portion comprise a splined clamping surface configured for gripping the tubular beam member.

5. The PV mounting system of claim 4, wherein the tubular beam member comprises a splined beam surface for gripping the splined clamping surface.

6. The PV mounting system of claim 1, wherein moving the hinged clamp to the second position spreads the flanges outwardly from each other and into the lip of the base portion.

7. The PV mounting system of claim 1, wherein the first upper portion and the second upper portion comprise a pair of semi-circular edges in the first open position that form the two circular openings in the second closed position.

8. The PV mounting system of claim 7, wherein the semi-circular edges together apply a circular compressive force against the tubular beam member in the second closed position.

9. The PV mounting system of claim 1, wherein the PV module coupling device comprises clamping-style connector.

10. The PV mounting system of claim 1, wherein the PV module coupling device comprises a rock-it connector.

11. A photovoltaic (PV) mounting hardware support system comprising:
  a base portion comprising a circular puck having a through-hole formed therein and adapted to mount to a support structure via a mechanical fastener passing through the through-hole;
  a hinged clamp comprising a pair of flanges connected by hinges that in a first open position of the hinges is not locked to the base portion and in a second closed position of the hinges is locked to the base portion; and
  a beam member configured as a mount for a PV module coupling device, wherein in the second position of the hinged clamp the beam member is forcibly held between the pair of flanges,
  wherein the hinged clamp covers the through hole in the second position, wherein the base portion comprises a lip that the pair of flanges forcibly locks within.

12. The PV system of claim 11, wherein the hinged clamp comprises a boxed structure for holding the beam member when the hinged clamp is in the second closed position.

13. The PV system of claim 11, wherein the hinged clamp comprises locking tabs configured to maintain the pair of flanges in the second closed position to secure the beam member.

14. The PV system of claim 11, wherein the hinged clamp comprises splined surfaces for engaging the beam member.

15. A photovoltaic (PV) mounting hardware support system comprising:
  a base portion comprising a circular lip, wherein the lip curves inwardly toward a middle portion of the base portion;
  a hinged clamp comprising a first clamp portion hingedly connected to a second clamp portion and operable to lock the first clamp portion and second clamp portion to the base portion by engaging the lip; and
  a beam member configured as a mount for a PV module coupling device, wherein the beam member is clamped between the first clamp portion and second clamp portion when the first and second clamp portions engage the lip and are locked to the base portion, wherein the hinged clamp comprises wedges that forcibly lock under the lip of the base portion when the first and second clamp portions are locked to the base portion.

16. The PV system of claim 15, wherein the hinged clamp comprises a first hinge and a second hinge that hingedly connect the first clamp portion and second clamp portion.

17. The PV system of claim 15, wherein the hinged clamp closes to form a boxed structure about the beam member.

* * * * *